ized Patent [19] [11] 3,887,989
Maynard [45] June 10, 1975

[54] BEARING PULLER DEVICE

[76] Inventor: Wade Maynard, 7009 S.W. 14th St., Des Moines, Iowa 50309

[22] Filed: Feb. 7, 1973

[21] Appl. No.: 330,211

[52] U.S. Cl. .................... 29/427; 29/263; 29/283
[51] Int. Cl. ............................................ B23p 19/02
[58] Field of Search ............................. 29/259–265

[56] References Cited
UNITED STATES PATENTS

| | | | |
|---|---|---|---|
| 1,457,841 | 6/1923 | Johnson | 29/261 |
| 2,171,910 | 9/1939 | Blackwood, Jr. | 29/261 |
| 3,358,352 | 12/1967 | Wilcox | 29/263 |
| 3,408,724 | 11/1968 | Hoeijenbos | 29/263 |

Primary Examiner—Al Lawrence Smith
Assistant Examiner—Harold P. Smith, Jr.
Attorney, Agent, or Firm—Jerome Goldberg

[57] ABSTRACT

A device for removing bearings from motor vehicles, such as pinion or carriage bearings. The device includes an elongated hollow housing to telescope over a bearing shaft on which the bearing is seated. An outer collar and an inner collar are attached to the housing. Clamp means grip the inner collar and the bearing assembly to cause the bearing to be pulled from its seat when pressure is applied to the shaft. The bearing assembly is retained between the clamp means and the outer collar. The collars may be adjustable on the housing to insure proper gripping of the clamp means during bearing removal. For bearings which are not mounted on outward extending bearing shafts a stud is provided for positioning in the bearing bore. The external pressure is then applied to the stud for releasing the bearing from its seat.

17 Claims, 4 Drawing Figures

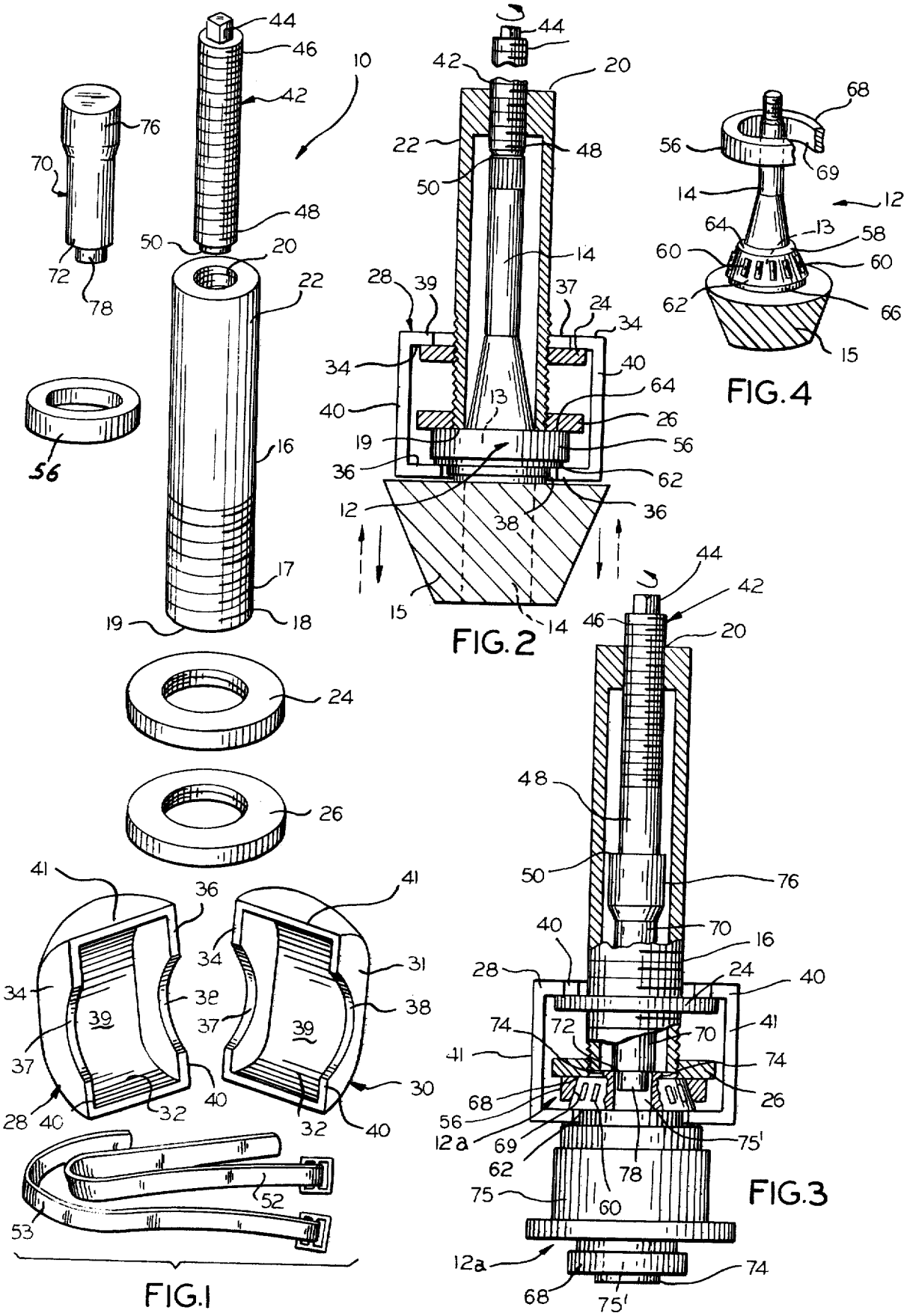

BEARING PULLER DEVICE

BACKGROUND OF THE INVENTION

This invention relates generally to a bearing puller tool, and more particularly relates to a device for removing automotive bearings, such as pinion, carriage and side bearings from associated shafts or cylinders of a motor vehicle.

In the past, chisels and hammers were frequently used to loosen and remove the bearing assemblies from their seat on the bearing shaft or axle. This required substantial time and effort, and frequently the bearing assembly and associated shaft became scored and damaged. At times, the bearing assembly due to an uneven distribution of force, shattered and exploded into a multitude of sharp and jagged pieces or particles; thus, endangering the servicing mechanics and persons in the vicinity.

To properly remove a bearing, it is important to apply straight and square pressure on the bearing shaft or housing so as not to damage the bearing or associated parts. Generally, it is advised to confine the pressure to the part or element which is tight. This prevents exposing the bearing balls or rollers to a heavy force that could cause damage or indentations in the inner and outer race.

Previously, bearing presses or pullers which were designed to exert an even distribution of pressure against the bearing, were usually expensive, bulky and required external electrical or hydraulic power for ramming the bearing shaft. Such tools are generally found in the large or specialized automotive repair shops.

The small shop or local gas filling station could not afford the tooling required to repair the various bearing assemblies contained in the numerous makes of motor vehicles. Hence, the bearing assemblies and the shaft on which they were mounted, were removed from the vehicle and transported to the specialty repair shop having the proper tooling.

Several type portable and less expensive bearing tools have been proposed to decrease cost, and enable bearing repair or replacement in the field. However, the previous portable tools did not have the capability to maintain the forces acting on the bearing assembly straight and even throughout the pulling operation. The subject invention, on the other hand, provides a simplified and effective means for pulling bearing assemblies such as pinion or differential bearings.

The bearing puller herein maintains the force acting on the bearing assembly straight and even throughout the pulling operation. The subject invention includes means for locking the outer race in place during the pulling operation. Thus, by utilizing the outer race and concentrating the applied forces, the possibility of damage to the bearing assembly during pulling is minimized, if not virtually eliminated.

Accordingly, a primary object of the invention is to provide a device for readily removing bearings from shafts of motor vehicles. A related object is to provide such a device which may also be utilized for mounting bearings on shafts of motor vehicles.

Another object is to provide a device capable of precisely controlling the force applied for pulling the bearing.

Another object is to provide a bearing pulling means, which is suitable for use with a variety of different bearing assemblies.

Another object is to provide a bearing puller which minimizes the possibility of the shattering or damaging of the bearing or bearing assembly during pulling.

Another object is to provide clamping buckets and lock means to ensure a positive grip of the buckets with the bearing.

Another object is to provide means for evenly distributing the forces acting on the bearing during its removal from its saat.

Still another object is to utilize the outer race of a bearing assembly during the pulling operation, to prevent damage to the bearings and indentations in the inner and/or outer races.

BRIEF DESCRIPTION OF THE DRAWINGS

Referring now to the drawings, in which the same characters of reference are employed, to indicate corresponding or similar parts throughout the several figures of the drawings:

FIG. 1 is an exploded view of the various component parts of the bearing puller device, embodying the principles of the invention;

FIG. 2 illustrates the bearing puller operatively in place for pulling a pinion bearing assembly from the bearing shaft;

FIG. 3 illustrates the bearing puller device operatively in a place for pulling a bearing assembly from a seat, which does not include an elongated bearing shaft, and a removable stud is shown used in place of such bearing shaft; and FIG. 4 is a perspective view of the pinion bearing assembly, to illustrate that the outer race shown fragmented, is loose after the bearing housing (not shown) is removed and prior to asembling the bearing puller in FIG. 1.

DESCRIPTION OF PREFERRED EMBODIMENT

Referring now particularly to FIGS. 1, 2 and 4 of the drawing, the reference numeral 10 indicates generally a bearing puller or press device embodying the principles of the invention. The puller 10 comprises a plurality of parts, which are readily assembled together to loosen, for example, a pinion bearing assembly indicated generally by the reference numeral 12 from its seat 13 on a bearing shaft 14. A pinion 15 as shown is secured to the bottom of shaft 14. The puller 10 may also be used for mounting such bearing assembly 12 on the bearing shaft 14.

The bearing puller 10 comprises an elongated open ended hollow housing 16. The length and the inside diameter of housing 16 are dimensioned to position over the bearing shaft 14. Housing 16 includes external threads 17 at the bottom end 18 which extends a distance upward from the bottom edge 19, as viewed in FIG. 1. An internally threaded sleeve member 20 is welded or otherwise rigidly secured to the inside at the top end 22 of the housing 16.

An upper ring nut 24 and a lower ring nut 26 are threadedly associated with the threaded bottom end 18.

A pair of buckets 28, 30 are operatively positioned to encircle the bearing assembly 12 and the ring nuts 24 and 26. For convenience of illustration, only bucket 28 is shown positioned between ring nut 29 and bearing assembly 12. Each bucket 28, 30 of the pair is substantially the same size and comprises a cradle 32 and a pair of opposed side walls 34, 36. The side walls 34, 36 are flat and include respectively arcuate cutouts 37, 38. The cradle 32 has a concave inner surface 39 and a convex outer surface. The outer side edges 40 and cradle edge 41 are flat to provide abutting surfaces, one bucket with the other bucket.

As shown cutout 37 is larger in size than cutout 38. Thus, sides 34 or 36 of the bucket 28 or 30 may be used for one size bearing shaft and the opposite side for a different size bearing shaft. The bucket pairs 28, 30 may also be dimensioned in different sizes to accommodate different sized bearing assemblies 12.

The individual buckets 28, 30 may be formed in one piece by a suitable molding process. Alternatively, they could be formed by cutting a section of standard pipe having the desired inside and outside diameter dimensions. A standard washer may be welded or otherwise secured to each of the outer opposed edges of the pipe sections. The washer openings must provide the proper size for the cutouts 37, 38 of the buckets 28, 30.

An elongated screw member 42 is externally threaded to engage the threads of sleeve member 20. A square nut 44 which may also be hexagonal or other suitable shape, is welded or otherwise formed to the upper end 46 of screw member 42. The nut 44 provides a positive gripping surface for revolving the screw member 42 with an impact wrench, ratchet or other suitable tool. The opposite or bottom end 48 of screw 42 may include a protruding tip 50. Tip 50 concentrates the force from the screw member 42 on the top end of the bearing shaft 14.

A fastening means such as belts 52, 53 may be tightened around the buckets 28, 30 to secure them in place around the bearing assembly 12. Alternatively, resilient U members (not shown) may be used to hug the buckets 28, 30.

As may be seen specifically in FIG. 4, the bearing assembly 12 includes an outer race 56, an inner race 58, and bearings 60 which are positioned in a bearing cage 62. The bearing cage 62 is movably locked between an upper ridge 64 and a lower ridge 66 of the inner race 58. The outer race 56 includes an upper circular lip 68 which covers the outer surface of the upper ridge 64 of the inner race 58. The inner surface 69 of the outer race 58 inclines downward from the lip 68. In FIG. 4, the outer race 58 is shown loosely associated in the bearing assembly 13 after the bearing housing (not shown) is removed.

For bearing assemblies which are not mounted on an elongated shaft 14, such as a differential bearing assembly indicated generally by reference designation 12a in FIG. 3, a removable bolt or stud 70 (FIG. 1) is used. The bottom end 72 of bolt 70 is positioned on a shaft portion 74 of the housing 75. A shaft portion 74 protrudes outward from opposite ends of housing 75 and serves as the seat 13 for the bearing assembly 12a. The shaft portion 74 includes a bore 75' which communicates with the inside of the housing 75.

The top end 76 of bolt 70 has a larger cross-sectional area than the bottom end 72. The bolt 70 includes a short neck 78 at the bottom end 72 to concentrate the applied forces. The different diameter ends 72, 76 enable more flexibility and effectiveness in the use of the bolt 70. However, in order that the bolt 70 will be stable inside housing 16, the larger diameter end 76, should be just slightly less than the internal diameter of housing 16.

Referring now more particularly to FIGS. 2 and 4, the assembly and operation of the bearing puller 10 will be described. The upper ring nut 24 and the lower ring nut 26 are screwed onto the lower end 18 of the housing 16. The outer race 56, which is loosely associated with the bearing assembly 12 after the bearing housing (not shown) is removed as may be seen in FIG. 4, should be placed in its normal position as shown in FIG. 2. The circular lip 68 of the outer race 56 in this position is aligned with the upper ridge 64 of the inner race 58. The outer race 56 encloses and protects the bearing cage 62.

The housing 16 is positioned over the bearing shaft 14 until the bottom edge 19 contacts the upper lip 68 of the outer race 56. The lower ring nut 26 should be screwed downward until solidly contacting the outer race 56 of the bearing assembly 12.

Bucket 28 is positioned around the bearing assembly 12 and the upper and lower ring nuts 24, 26 as shown in FIGS. 2 and 3. Bucket 28 encloses about one-half of the bearing assembly and ring nuts. Cutout 37 extends around the housing 16 whereas cutout 38 extends around the bottom of the bearing assembly 12. The flat side 36 of the bucket 28 should be in contact with the bottom of the bearing cage 62. Now the upper ring nut 24 should be screwed upward until contacting the flat side 34 of the bucket 28. Preferably, the contact between the ring nut 24 and bucket side 34 should be snug and not tight.

The other bucket 30 should now be positioned around the bearing assembly 13, so that the edges 40 and 41 of buckets 30 are positioned opposed and in abutting contacts with the same edges 40 and 41 of bucket 28. Securing means such as the belts 52 and 53 shown in FIG. 1, are positioned around the buckets 28, 30.

When the buckets 28, 30 are secured together the cutouts 37 circumscribe the housing 16 and the cutouts 38 circumscribe the bottom of the bearing assembly 13. The flat sides 36 of the buckets 28, 30 contact the bottom of the bearing cage 62 and the opposed flat sides 34 are in contact with the upper ring nut 24.

The screw member 42 is screwed into sleeve member 20, until the tip 50 abuts the upper end of the bearing shaft 14. A ratchet or other suitable tool is placed on the square nut 44 of the screw member 42, to rotate the screw member 42 for inward movement. The rotational force is converted to a vertical force concentrated at the tip 50 which forces the shaft 14 and pinion 15 in the downward direction (FIG. 2). Continued rotation of the ratchet frees the bearing assembly 12 from its seat 13.

The entire bearing assembly 12 is contained between the lower ring nut 26 and sides 36 of the buckets 28, 30. Since the ring nut 26 locks the outer race 56 in place over the bearings 60, the bearings 60 are maintained inside the bearing cage 62, unable to fly out. Thus, the bearings 60 are fully protected. During removal, the bearing assembly 12 is clamped inside the buckets 28, 30. As the pinion 15 is moved downward, upward forces are applied by the sides 36 of the buckets 28, 30 against the bearing cage 62, and the upper ring 24 exerts an upward force against the sides 34 of the buckets 28, 30. The rings 24, 26 maintain the forces acting on the bearing assembly 12 flat and straight.

The differential bearing assembly 12a is similarly removed from its seat 13 on the shaft portion 74. The stud 70 is positioned on top of shaft portion 74. The neck 78 of the bolt 70 is lowered inside bore 75', and the bottom end 72 thereof contacts the upper end of the shaft portion 74. The upper and lower rings 24, 26 are threaded on the housing 16. The lower ring 26 should extend a few turns below the bottom end 19 of housing 16, in order to contact the outer race 56 which is located below the upper end of shaft portion 74.

The bottom edge 19 of housing 16, and the bottom end 72 of the stud 70 abutt the upper end of the shaft portion 74 and the lower ring 26 contacts the bearing cage 62 and outer race 56 of bearing assembly 12a. The screw member 42 is positioned so that the tip 50 abutts the upper end 76 of bolt 70. The application of force to the screw member 42 forces the shaft portion 74 downward to remove the bearing assembly 12a from its seat 13.

The housing 16, ring nuts 24, 26 and buckets 28, 30 could be similarly used for repositioning the bearing assemblies 12 and 12a back on their seats 13. As viewed in FIG. 2, the bearing assembly 12 would be locked between the lower ring 26 and the sides 36 of buckets 28 and 30. The buckets 28, 30 would clamp between the upper ring nut 24 and the bottom of the bearing cage 62. As force is applied to the pinion shaft 14 in the upward vertical direction shown by the dotted arrows in FIG. 2, the bearing assembly 12 is repositioned on its seat 13. The lower and upper rings 24, 26 and the buckets 28, 30 maintain the upward force straight and even, and thereby protects the bearings during installation. However, it would be required to maintain the housing 16 is a fixed position, such as clamping it to a vise.

It is also within the contemplation of the invention than an hydraulic ram (not shown) may be used in place of screw member 42. Thus, the force from the hydraulic ram applied to the upper end of the pinion shaft 14 frees the pinion bearing 12 from the shaft 14.

The description of the preferred embodiment of this invention is intended merely as illustrative of this invention the scope and limits of which are set forth in the following claims:

I claim:

1. A bearing puller device to remove or position a bearing assembly from its seat on a shaft, said puller comprising:
   a tubular member;
   an upper collar and a lower collar associated with said tubular member, each of said collars being adjustable on said tubular member; and
   clamp means for gripping said upper collar and said bearing assembly, said bearing assembly being operatively positioned between said lower collar and said clamp means, said bearing assembly being removed or positioned on said seat by the application of an external force to said shaft.

2. The bearing puller of claim 1, wherein said bearing assembly includes an upper side and a lower side, said lower collar being associated with said tubular member for contacting said upper side of the bearing assembly and said clamp means contacting the lower side of the bearing assembly when applying said external force.

3. The bearing puller of claim 1, wherein said tubular member is hollow, and said bearing puller further includes:

a bolt for contacting said shaft, said tubular member being operatively positioned over said bolt, the application of said external force to said bolt causing said bearing assembly to be freed from said seat.

4. The bearing puller of claim 3, wherein the end of said bolt for contacting said shaft has a diameter less than the diameter of the bore of the bearing assembly through which said shaft extends.

5. The bearing puller of claim 1, wherein each of said collars is threadedly associated with the outside of said tubular member.

6. The bearing puller of claim 1, wherein said tubular member is hollow and the upper end thereof includes a threaded sleeve, and said puller further comprises:
   a threaded member extending through said sleeve for moving downward in said tubular member for forcing downward said shaft on which the bearing is seated.

7. The bearing puller of claim 1, wherein said tubular member is hollow and the outer bottom surface is threaded to threadedly receive said upper and lower collars, said clamp means comprising a pair of buckets with each bucket having a cradle and an upper side and a lower side, said lower side contacting said bearing assembly and the upper side contacting said upper collar, said cradle of said bucket pairs encircling said collars and said bearing assembly.

8. A method for pulling or mounting a bearing assembly on a shaft using a tool having a tubular member, a pair of collars and a pair of clamp members, said method comprising:
   positioning the collars on the outside of the tubular member, so that there is a lower collar and an upper collar;
   positioning said lower collar so that it contacts the upper end of said bearing assembly;
   positioning one of said clamp members so that the lower side of the clamp member extends underneath the bearing cage of the bearing assembly and the upper side thereof extends over the upper collar;
   positioning said upper collar so that the upper collar contacts the upper side of said one of clamp member;
   positioning the other clamp member in an opposed position with respect to said one clamp member, with the upper side of said other clamp member also contacting said upper collar and the lower side thereof extending underneath said bearing cage;
   securing said clamp members together; and
   applying an external force to free or mount said bearing assembly from or on said shaft.

9. The method of claim 8, wherein the outer race of the bearing assembly is removable, and said method further including:
   positioning the outer race on the bearing cage, so that the bearings lie between the outer and inner race; and
   securing said outer race in said position on the bearing cage with said lower collar.

10. The method of claim 9, wherein said shaft extends outward from said bearing assembly and said method further comprises positioning said tubular member over said shaft.

11. The method of claim 9, wherein said shaft includes an upper end adjacent said bearing assembly, and said method further comprises:

inserting a bolt inside said tubular member for contacting the upper end of said shaft; and applying said external force to said bolt.

12. The method of claim 11 includes:

positioning said lower collar so that a portion thereof extends below the bottom end of the tubular member prior to contacting the bearing assembly with the lower collar.

13. A bearing puller device to remove or mount a bearing assembly from or on its seat on a shaft, said puller comprising:

a tubular member;

a first collar adjustable on said tubular member, for operatively contacting the upper part of said bearing assembly;

a second collar adjustable on said tubular member; and gripping means for contacting the bottom of said bearing assembly, and said second collar, said bearing assembly being retained between said first collar and said gripping means as an external force is applied to free said bearing assembly from said shaft.

14. The bearing puller of claim 13, wherein said gripping means includes:

one side for contacting said second collar and a second side for contacting said bearing assembly; and connecting means for connecting said sides in a spaced apart relationship.

15. The bearing puller of claim 13, wherein the outer race of said bearing assembly is removable, said first collar contacting said outer race for securing the outer race on said bearing assembly.

16. The bearing puller of claim 13, wherein said shaft includes a bore extending inward from an upper end of said shaft and said bearing puller further comprising:

a bolt having a large diameter end and a smaller diameter end, said smaller diameter end extending in said bore, said external force being applied to said bolt.

17. The bearing puller of claim 13, wherein said first collar is adjustable on the bottom end of said tubular member, and a portion of said first collar extending operatively below the bottom end of the tubular member to contact said bearing assembly.

* * * * *